US010301932B2

(12) United States Patent
Chen et al.

(10) Patent No.: US 10,301,932 B2
(45) Date of Patent: May 28, 2019

(54) ULTRASONIC CASING AND CEMENT EVALUATION METHOD USING A RAY TRACING MODEL

(71) Applicant: Halliburton Energy Services, Inc., Houston, TX (US)

(72) Inventors: Tianrun Chen, Sugar Land, TX (US); Yibing Zheng, West University Place, TX (US); Tatiana Gilstrap, The Woodlands, TX (US); Arthur Chuen Hon Cheng, Houston, TX (US); Robert Eric Epstein, Spring, TX (US); Zhijuan Zhang, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/417,439

(22) PCT Filed: Jul. 15, 2014

(86) PCT No.: PCT/US2014/046746
§ 371 (c)(1),
(2) Date: Jan. 26, 2015

(87) PCT Pub. No.: WO2015/023384
PCT Pub. Date: Feb. 19, 2015

(65) Prior Publication Data
US 2016/0010448 A1  Jan. 14, 2016
US 2016/0265348 A2  Sep. 15, 2016

Related U.S. Application Data

(60) Provisional application No. 61/866,201, filed on Aug. 15, 2013.

(51) Int. Cl.
*E21B 47/00* (2012.01)
*E21B 47/16* (2006.01)
*G01V 1/40* (2006.01)

(52) U.S. Cl.
CPC ............. *E21B 47/16* (2013.01); *E21B 47/00* (2013.01); *E21B 47/0005* (2013.01); *G01V 1/40* (2013.01)

(58) Field of Classification Search
CPC ... G01V 1/50; G01V 1/48; G01V 1/44; G01V 1/306; G01V 11/002; G01V 1/284;
(Continued)

(56) References Cited

U.S. PATENT DOCUMENTS 3,399,745 A   9/1968  Sparks
5,763,773 A * 6/1998  Birchak .............. E21B 47/0005
                                              181/104
(Continued)

FOREIGN PATENT DOCUMENTS

GB       2457551      8/2009
WO    WO 98/52033    11/1998
WO    WO 99/35490     7/1999

OTHER PUBLICATIONS

Market, Jennifer et al, "Reliable LWD Calliper Measurements," SPE Offshore Europe Oil and Gas Conference and Exhibition, Aberdeen, Sep. 20011, pp. 1-13.*
(Continued)

*Primary Examiner* — John E Breene
*Assistant Examiner* — Jeffrey P Aiello
(74) *Attorney, Agent, or Firm* — Benjamin Fite; Parker Justiss, P.C.

(57) ABSTRACT

Systems, methods, and software for determining impedance of a casing-cement bond are described. In some aspects, the bond impedance is determined based on results of compar-
(Continued)

ing a measured waveform and a model waveform. The model waveform corresponds to an estimated impedance of the bond and corresponds to a ray tracing of an acoustic signal that accounts for a radiation pattern of the acoustic transmitter and a curvature of the well casing. The measured waveform and the model waveform are generated based on operating an acoustic transmitter and an acoustic receiver within a wellbore comprising the well casing.

20 Claims, 11 Drawing Sheets

(58) Field of Classification Search
CPC ........ G01V 1/40; G01N 1/00; E21B 47/0005; E21B 47/16; E21B 47/00
USPC .............. 181/102, 104, 105; 367/25, 35, 86; 702/6, 11, 17, 14, 39
See application file for complete search history.

(56) References Cited

U.S. PATENT DOCUMENTS

| | | | | |
|---|---|---|---|---|
| 5,995,447 | A * | 11/1999 | Mandal | G01V 1/44 181/106 |
| 6,002,639 | A * | 12/1999 | Birchak | G01V 1/44 367/25 |
| 6,021,093 | A * | 2/2000 | Birchak | G01V 1/44 181/105 |
| 6,026,913 | A * | 2/2000 | Mandal | E21B 47/02208 175/45 |
| 6,041,861 | A * | 3/2000 | Mandal | E21B 47/0005 166/250.01 |
| 6,125,079 | A * | 9/2000 | Birchak | G01V 1/44 181/104 |
| 8,157,008 | B2 | 4/2012 | Lilley | |
| 2004/0122595 | A1* | 6/2004 | Valero | G01V 1/366 702/11 |
| 2007/0285274 | A1 | 12/2007 | Esmersoy | |
| 2008/0112262 | A1 | 5/2008 | Tang et al. | |
| 2010/0061183 | A1 | 3/2010 | Mandal et al. | |
| 2010/0126718 | A1 | 5/2010 | Lilley | |
| 2010/0213943 | A1 | 8/2010 | Georgi et al. | |
| 2010/0241407 | A1 | 9/2010 | Hsu et al. | |
| 2011/0134719 | A1 | 6/2011 | Kinoshita et al. | |
| 2012/0069713 | A1 | 3/2012 | Geerits | |
| 2013/0116926 | A1* | 5/2013 | Rodney | G01V 1/42 702/8 |
| 2013/0155812 | A1* | 6/2013 | Froelich | E21B 47/0005 367/35 |
| 2014/0052376 | A1* | 2/2014 | Guo | E21B 47/00 702/11 |

OTHER PUBLICATIONS

International Search Report and Written Opinion of the International Searching Authority issued in International Application No. PCT/US2014/046746 dated Nov. 24, 2014; 10 pages.
Al-Suwaidi et al., "Increased Certainty in the Determination of Zonal Isolation through the Integration of Annulus Geometry Imaging and Improved Solid-Fluid Discrimination", SPE Middle East Oil and Gas Show and Conference, Mar. 15, 2009, 10 pages.
Extended European Search Report, EP Application No. 14824756.2, dated Sep. 10, 2015, 9 pages.
Enwemadu et al., "An Integrated Approach to Cement Evaluation", Abu Dhabi International Petroleum Conference and Exhibition, Nov. 11, 2012, 10 pages.
Schlumberger et al., "Case Studies in Evaluation of Cement with Wireline Logs in a Deep Water Environment", SPWLA 52nd Annual Logging Symposium, May 14, 2011, pp. 1-15.
Schlumberger, "Isolation Scanner—Advanced Evaluation of Wellbore Integrity", Jan. 1, 2011, pp. 1-8.
PCT International Preliminary Report on Patentability, PCT/US2014/046746, dated Feb. 25, 2016, 7 pages.

* cited by examiner

ULTRASONIC CASING AND CEMENT EVALUATION METHOD USING A RAY TRACING MODEL

CLAIM OF PRIORITY

This application is a U.S. National Stage of International Application No. PCT/US2014/046746, filed Jul. 15, 2014, which claims priority to U.S. Application No. 61/866,201 filed on Aug. 15, 2013, the entire contents of which are hereby incorporated by reference.

BACKGROUND

This disclosure relates to evaluating the casing and cement of a well structure.

Well casing and cement evaluation techniques can be used to determine the quality of cement-casing bonding in well casings. In particular, analysis of ultrasonic waves reverberating within the casing can provide an estimation of the impedance of cement-casing bonding, and therefore can be used to determine whether the material behind the casing is solid or liquid. The accuracy of these assessments may be essential to the safety and economy of oil field operations.

DESCRIPTION OF DRAWINGS

Like reference symbols in the various drawings indicate like elements.

DETAILED DESCRIPTION

Current complex and extreme drilling conditions found in typical oil field excavation and exploration applications dictate the development of new approaches to monitoring well integrity and assuring operational safety in cased boreholes. In cased boreholes, the annular space between the casing and the formation wall is filled with cement that supports the casing. The cement also serves as zonal isolation against fluid penetration. Good cement-casing bonding is required to assure well safety.

Existing applications of ultrasonic technology have been applied to determining the quality of cement-casing bonding in thin casings (e.g., up to 0.75 in). Analysis of ultrasonic waves reverberating within the casing can provide an estimation of the impedance of cement-casing bonding, and therefore can be used to determine whether the material behind the casing is solid or liquid. One or more implementations described herein provide new ultrasonic approaches to evaluating the cement-casing bonding in a cased well behind thick casing (e.g., thicker than 0.8 inches). This may be done, for example, through an inversion algorithm and a unique theoretical modeling that uses a ray tracing method to take into account the transducer's beam spreading and the surface curvature of the casing.

Figure 1A:
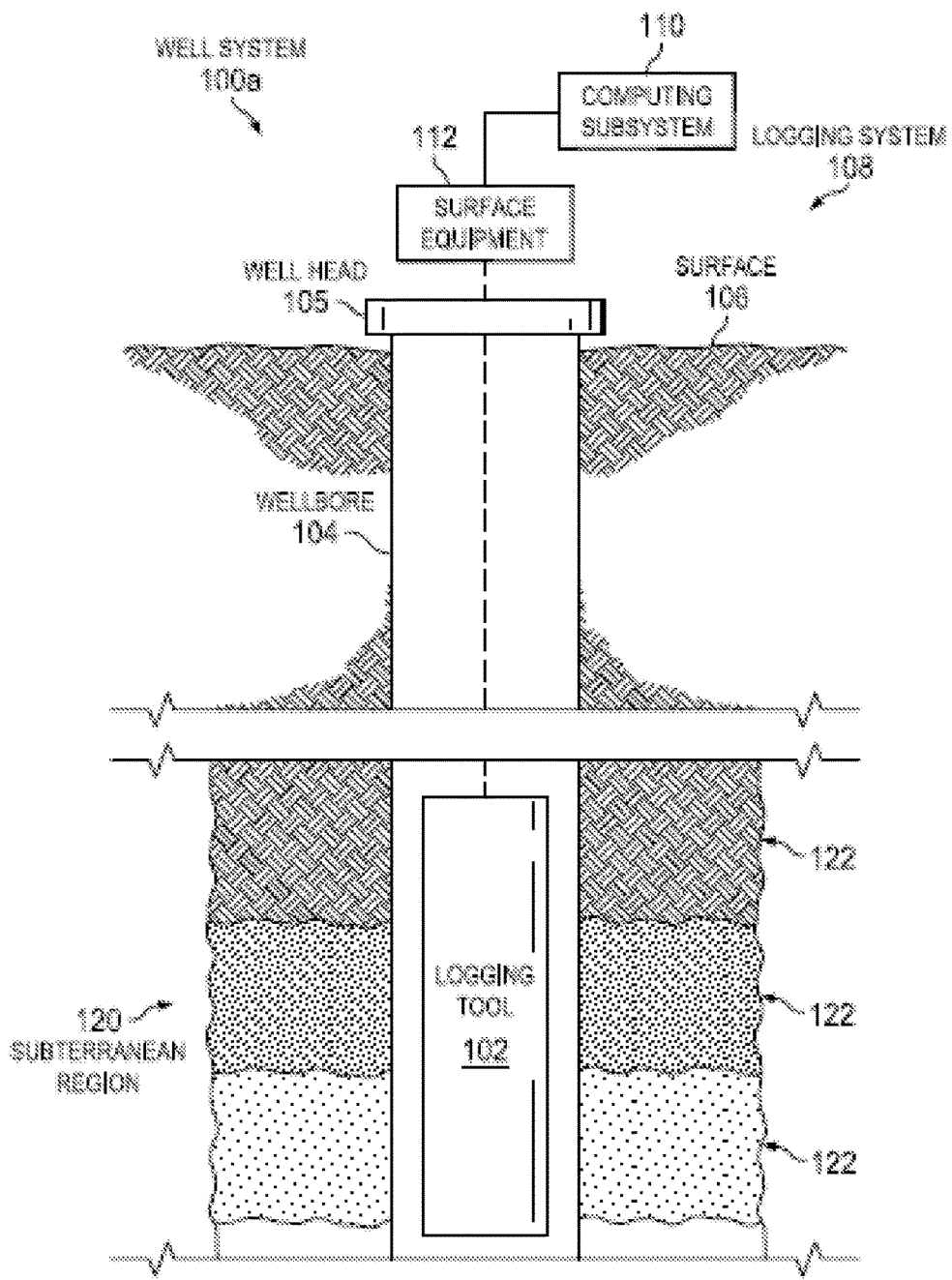
FIG. 1A is a diagram of an example well system.

FIG. 1A is a diagram of an example well system 100a. The example well system 100a includes a logging system 108 and a subterranean region 120 beneath the ground surface 106. A well system can include additional or different features that are not shown in FIG. 1A. For example, the well system 100a may include additional drilling system components, wireline logging system components, etc.

The subterranean region 120 can include all or part of one or more subterranean formations or zones. The example subterranean region 120 shown in FIG. 1A includes multiple subsurface layers 122 and a wellbore 104 penetrated through the subsurface layers 122. The subsurface layers 122 can include sedimentary layers, rock layers, sand layers, or combinations of these other types of subsurface layers. One or more of the subsurface layers can contain fluids, such as brine, oil, gas, etc. Although the example wellbore 104 shown in FIG. 1A is a vertical wellbore, the logging system 108 can be implemented in other wellbore orientations. For example, the logging system 108 may be adapted for horizontal wellbores, slant wellbores, curved wellbores, vertical wellbores, or combinations of these.

The example logging system 108 includes a logging tool 102, surface equipment 112, and a computing subsystem 110. In the example shown in FIG. 1A, the logging tool 102 is a downhole logging tool that operates while disposed in the wellbore 104. The example surface equipment 112 shown in FIG. 1A operates at or above the surface 106, for example, near the well head 105, to control the logging tool 102 and possibly other downhole equipment or other components of the well system 100. The example computing subsystem 110 can receive and analyze logging data from the logging tool 102. A logging system can include additional or different features, and the features of a logging system can be arranged and operated as represented in FIG. 1A or in another manner.

In some instances, all or part of the computing subsystem 110 can be implemented as a component of, or can be integrated with one or more components of, the surface equipment 112, the logging tool 102, or both. In some cases, the computing subsystem 110 can be implemented as one or more discrete computing system structures separate from the surface equipment 112 and the logging tool 102.

In some implementations, the computing subsystem 110 is embedded in the logging tool 102, and the computing subsystem 110 and the logging tool 102 can operate concurrently while disposed in the wellbore 104. For example, although the computing subsystem 110 is shown above the surface 106 in the example shown in FIG. 1A, all or part of the computing subsystem 110 may reside below the surface 106, for example, at or near the location of the logging tool 102.

The well system 100a can include communication or telemetry equipment that allow communication among the computing subsystem 110, the logging tool 102, and other components of the logging system 108. For example, the components of the logging system 108 can each include one or more transceivers or similar apparatus for wired or wireless data communication among the various components. For example, the logging system 108 can include systems and apparatus for wireline telemetry, wired pipe telemetry, mud pulse telemetry, acoustic telemetry, electromagnetic telemetry, or a combination of these other types of telemetry. In some cases, the logging tool 102 receives commands, status signals, or other types of information from the computing subsystem 110 or another source. In some cases, the computing subsystem 110 receives logging data, status signals, or other types of information from the logging tool 102 or another source.

Logging operations can be performed in connection with various types of downhole operations at various stages in the lifetime of a well system. Structural attributes and components of the surface equipment 112 and logging tool 102 can be adapted for various types of logging operations. For example, logging may be performed during drilling operations, during wireline logging operations, or in other contexts. As such, the surface equipment 112 and the logging tool 102 may include, or may operate in connection with drilling equipment, wireline logging equipment, or other equipment for other types of operations.

Figure 1B:
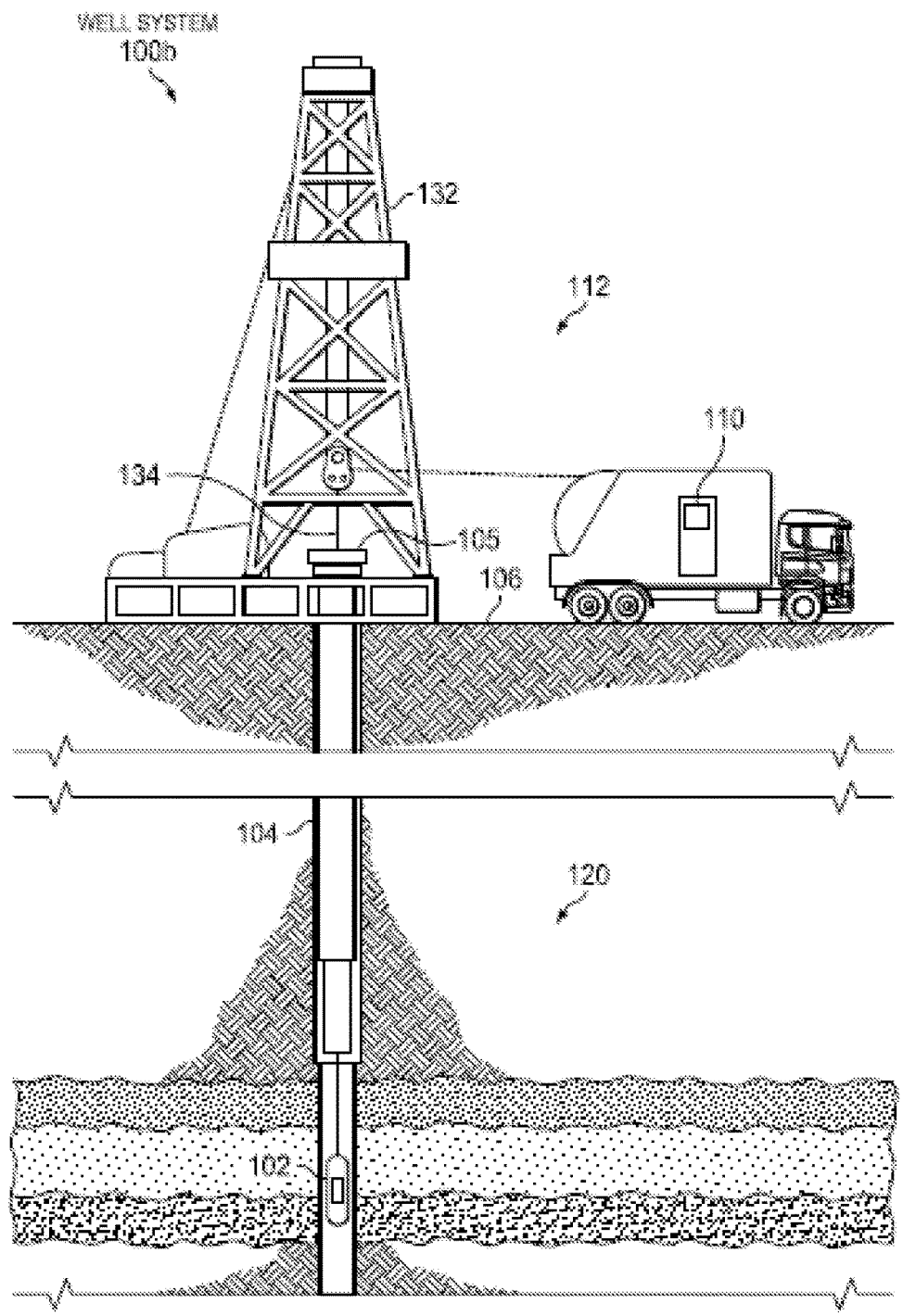
FIG. 1B is a diagram of an example well system that includes a logging tool in a wireline logging environment.

In some examples, logging operations are performed during wireline logging operations. FIG. 1B shows an example well system 100b that includes the logging tool 102 in a wireline logging environment. In some example wireline logging operations, the surface equipment 112 includes a platform above the surface 106 that is equipped with a derrick 132 that supports a wireline cable 134 that extends into the wellbore 104. Wireline logging operations can be performed, for example, after a drilling string is removed from the wellbore 104, to allow the wireline logging tool 102 to be lowered by wireline or logging cable into the wellbore 104.

Figure 1C:
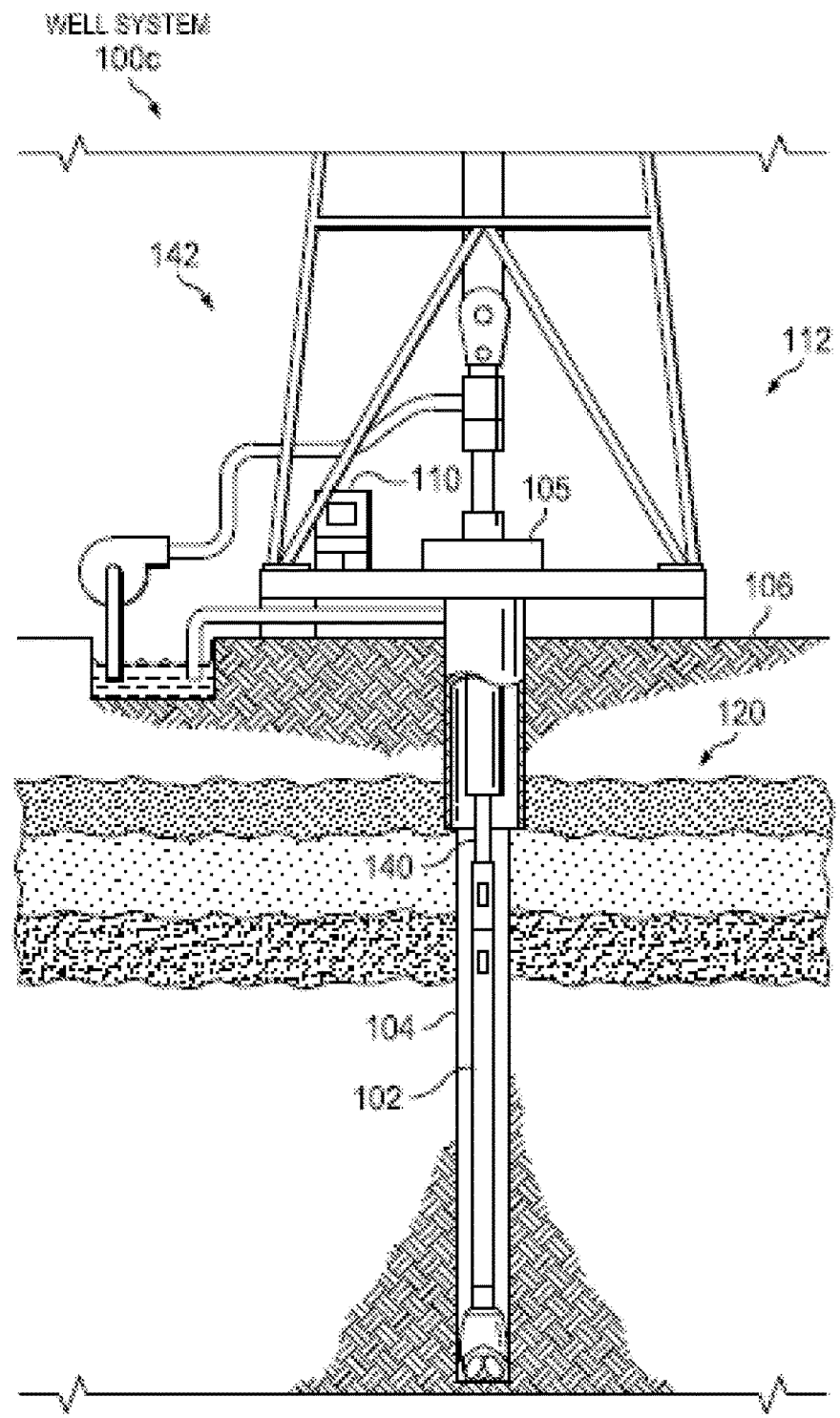
FIG. 1C is a diagram of an example well system that includes a logging tool in a logging while drilling (LWD) environment.

In some examples, logging operations are performed during drilling operations. FIG. 1C shows an example well system 100c that includes the logging tool 102 in a logging while drilling (LWD) environment. Drilling is commonly carried out using a string of drill pipes connected together to form a drill string 140 that is lowered through a rotary table into the wellbore 104. In some cases, a drilling rig 142 at the surface 106 supports the drill string 140, as the drill string 140 is operated to drill a wellbore penetrating the subterranean region 120. The drill string 140 may include, for example, a kelly, drill pipe, a bottom hole assembly, and other components. The bottom hole assembly on the drill string may include drill collars, drill bits, the logging tool 102, and other components. The logging tools may include measuring while drilling (MWD) tools, LWD tools, and others.

As shown, for example, in FIG. 1B, the logging tool 102 can be suspended in the wellbore 104 by a coiled tubing, wireline cable, or another structure that connects the tool to a surface control unit or other components of the surface equipment 112. In some example implementations, the logging tool 102 is lowered to the bottom of a region of interest and subsequently pulled upward (e.g., at a substantially constant speed) through the region of interest. As shown, for example, in FIG. 1C, the logging tool 102 can be deployed in the wellbore 104 on jointed drill pipe, hard wired drill pipe, or other deployment hardware. In some example implementations, the logging tool 102 collects data during drilling operations as it moves downward through the region of interest during drilling operations. In some example implementations, the logging tool 102 collects data while the drilling string 140 is moving, for example, while it is being tripped in or tripped out of the wellbore 104.

In some example implementations, the logging tool 102 collects data at discrete logging points in the wellbore 104. For example, the logging tool 102 can move upward or downward incrementally to each logging point at a series of depths in the wellbore 104. At each logging point, instruments in the logging tool 102 perform measurements on the subterranean region 120. The measurement data can be communicated to the computing subsystem 110 for storage, processing, and analysis. Such data may be gathered and analyzed during drilling operations (e.g., during logging while drilling (LWD) operations), during wireline logging operations, or during other types of activities.

The computing subsystem 110 can receive and analyze the measurement data from the logging tool 102 to detect properties of various subsurface layers 122. For example, the computing subsystem 110 can identify the density, material content, or other properties of the subsurface layers 122 based on the measurements acquired by the logging tool 102 in the wellbore 104.

Figure 2:
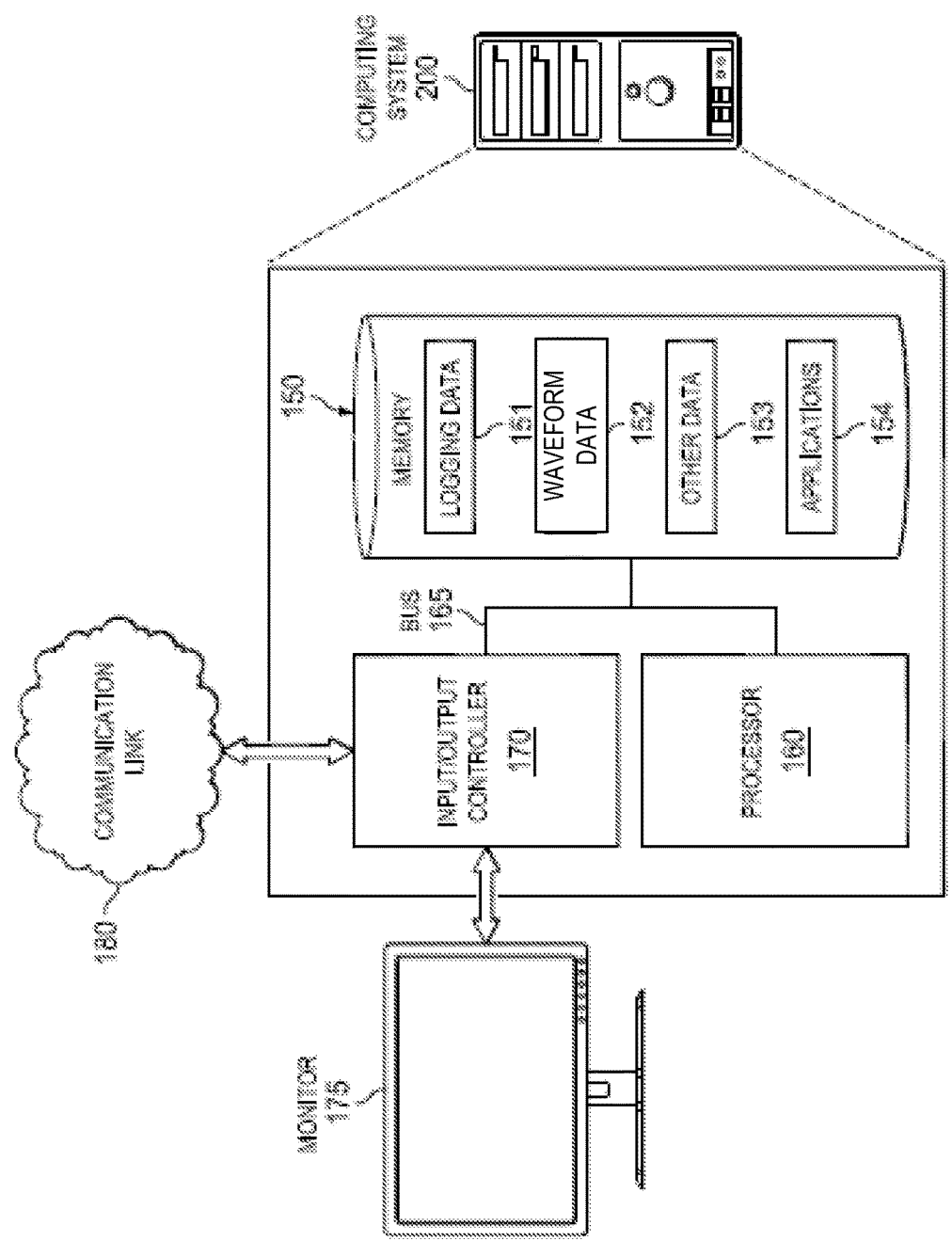
FIG. 2 is a diagram of an example computing system.

FIG. 2 is a diagram of the example computing system 200. The example computing system 200 can be used as the computing subsystem 110 of FIG. 1A, 1B, or 1C, or the example computing system 200 can be used in another manner. In some cases, the example computing system 200 can operate in connection with a well system (e.g., the well systems 100a, 100b, or 100c shown in FIG. 1A, 1B, or 1C) and be located at or near one or more wells of a well system or at a remote location. All or part of the computing system 200 may operate independent of a well system.

The example computing system 200 shown in FIG. 2 includes a memory 150, a processor 160, and input/output controllers 170 communicably coupled by a bus 165. The memory 150 can include, for example, a random access memory (RAM), a storage device (e.g., a writable read-only memory (ROM) or others), a hard disk, or another type of storage medium. The computing subsystem 110 can be preprogrammed or it can be programmed (and reprogrammed) by loading a program from another source (e.g., from a CD-ROM, from another computer device through a data network, or in another manner).

In some examples, the input/output controller 170 is coupled to input/output devices (e.g., a monitor 175, a mouse, a keyboard, or other input/output devices) and to a communication link 180. The input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network.

The memory 150 can store instructions (e.g., computer code) associated with an operating system, computer applications, and other resources. The memory 150 can also store application data and data objects that can be interpreted by one or more applications or virtual machines running on the computing system 200. As shown in FIG. 2, the example memory 150 includes logging data 151, waveform data 152, other data 153, and applications 154. The data and applications in the memory 150 can be stored in any suitable form or format.

The logging data 151 can include measurements and other data from a logging tool. In some cases, the logging data 151 include one or more measurements for each of multiple different logging points in a wellbore. For example, the logging point associated with a given measurement can be the location of the logging tool's reference point when the given measurement was acquired. Each measurement can include data obtained by one or more transmitter-receiver pairs operating at one or more signal frequencies. Each measurement can include data obtained by multiple transmitter-receiver pairs operating at one or more transmitter-receiver spacings. The logging data 151 can include information identifying a transmitter-receiver spacing associate with each measurement.

The waveform data 152 can include measured waveforms and model waveforms. The measured waveforms can be used to determine an impedance of the cement-casing bonding. The model waveforms can correspond to different assumed or estimated impedances. The waveform data 152 may include information associated with one or more logging points.

The other data 153 can include other information that is used by, generated by, or otherwise associated with the applications 154. For example, the other data 153 can include simulated data or other information that can be used by an engine to produce the waveform data 152 from the logging data 151.

The applications 154 can include software applications, scripts, programs, functions, executables, or other modules that are interpreted or executed by the processor 160. The applications 154 may include machine-readable instructions for performing one or more of the operations related to FIG. 9.

The applications 154 can obtain input data, such as logging data, simulation data, or other types of input data, from the memory 150, from another local source, or from one or more remote sources (e.g., via the communication link 180). The applications 154 can generate output data and store the output data in the memory 150, in another local medium, or in one or more remote devices (e.g., by sending the output data via the communication link 180).

The processor 160 can execute instructions, for example, to generate output data based on data inputs. For example, the processor 160 can run the applications 154 by executing or interpreting the software, scripts, programs, functions, executables, or other modules contained in the applications 154. The processor 160 may perform one or more of the operations related to FIG. 9. The input data received by the processor 160 or the output data generated by the processor 160 can include any of the logging data 151, the waveform data 152, or the other data 153.

In some implementations, the logging tool 102 of FIGS. 1A, 1B, and 1C includes an ultrasonic cement bond log tool. Ultrasonic cement bond log tools for oil field operations can use acoustic transducers. In some implementations, a cement bond log tool can have multiple transducers. In some implementations, the transducers contact the casing's inner wall. The transducers may be used as high amplitude transmitters to generate and emit ultrasonic waves into the well casing and the cement bonding behind the casing. The acoustic waves can be either body waves, such as compressional waves and shear waves, or surface waves. These acoustic waves travel inside the casing, cement, and formation, and are reflected and refracted/transmitted at each interface. The reflected and refracted/transmitted waves carry information about the casing thickness and cement bonding quality, and are recorded by either the original transducer or a second transducer for processing and interpretation (e.g., by an electronic processor of the tool). Measurements and/or processed data from the tool may be transmitted through a support cable to a surface control system, where they are reviewed by an operator. In some implementations, either additionally or alternatively, measurements are stored within the tool (e.g., in a data storage device) for future retrieval, processing, and/or review at the surface. In one or more implementations, the measurements and/or processed data from the tool may be transmitted via other communication schemes (e.g. mud-pulse telemetry, wired pipe, electromagnetic telemetry, acoustic telemetry, and/or other telemetry schemes) used downhole.

Figure 3:
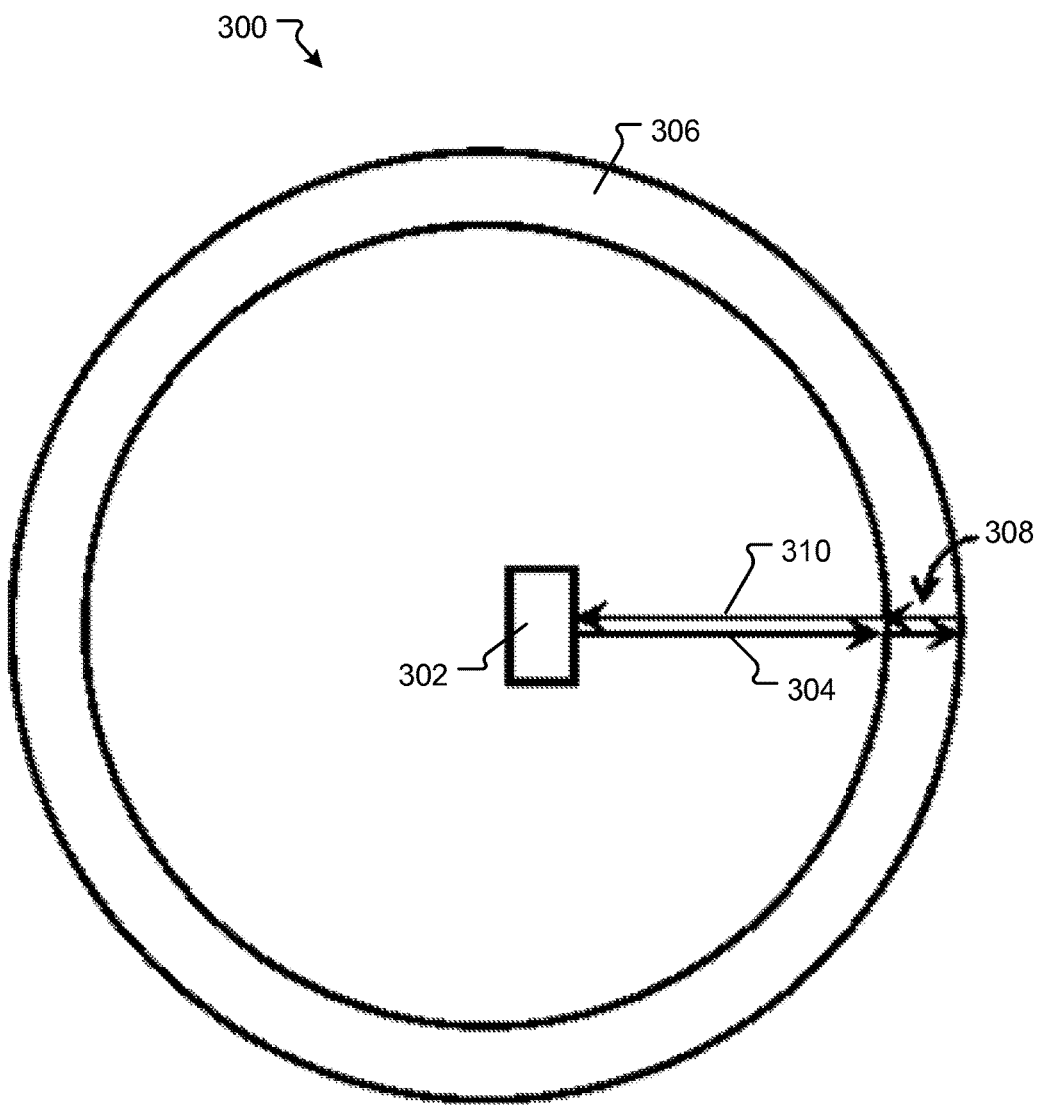
FIG. 3 shows an example tool having a one-transducer pulse-echo configuration.

In certain implementations, a cement bond log tool is arranged in one-transducer pulse-echo configuration 300, as shown in FIG. 3. In this configuration, one single transducer 302 is used as both transmitter and receiver. The transducer 302 may include an acoustic transmitter and an acoustic receiver. Acoustic energy 304 generated by the transducer 302 reflects from the interfaces of the well casing 306, and may reflect multiple times inside the casing 306, as shown by wave reverberation 308. Returning energy 310 is detected by the transducer 302.

Figure 4:
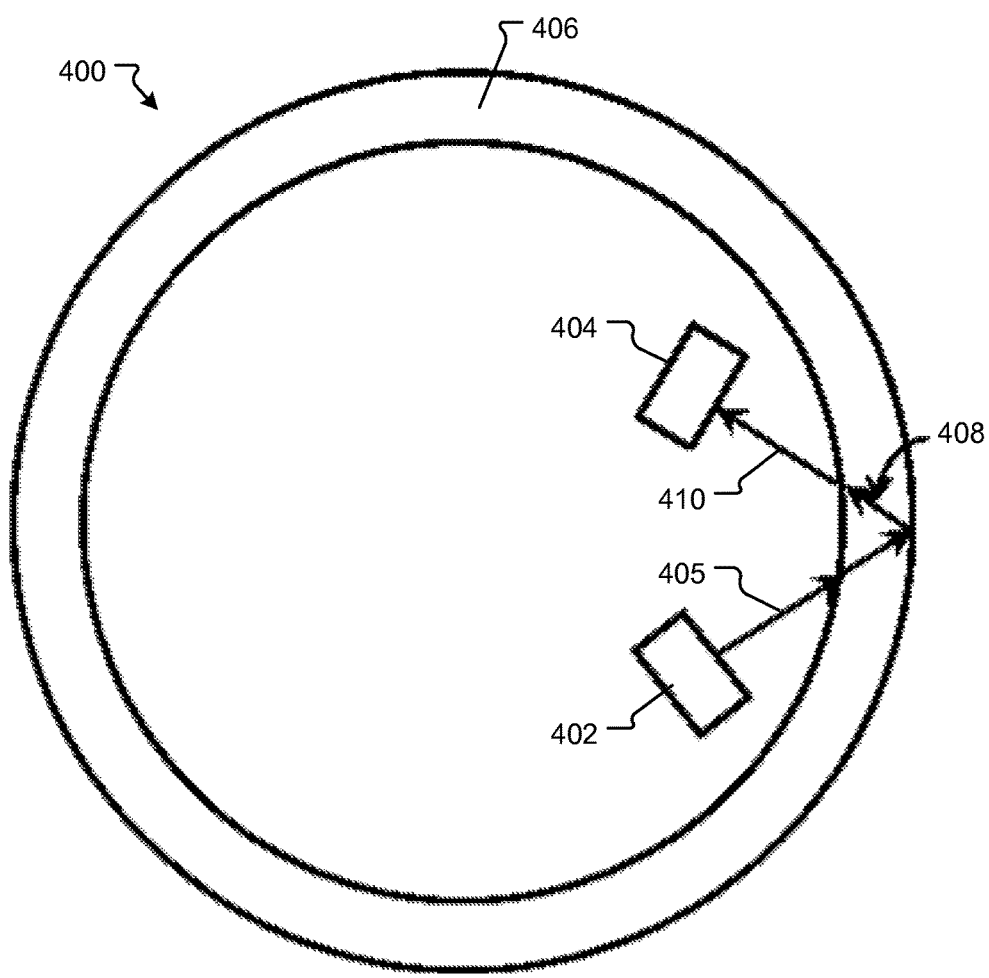
FIG. 4 shows an example tool having a two-transducer pitch-catch configuration.

In some implementations, a cement bond log tool is arranged in a two-transducer pitch-catch configuration 400, as shown in FIG. 4. The transducers include an acoustic transmitter 402 and an acoustic receiver 404. Acoustic energy 405 generated by the transducer 402 reflects from the interfaces of the well casing 406, and may reflect multiple times inside the casing 406, as shown by wave reverberation 408. Returning energy 410 is detected by the receiver 404.

Figure 5:
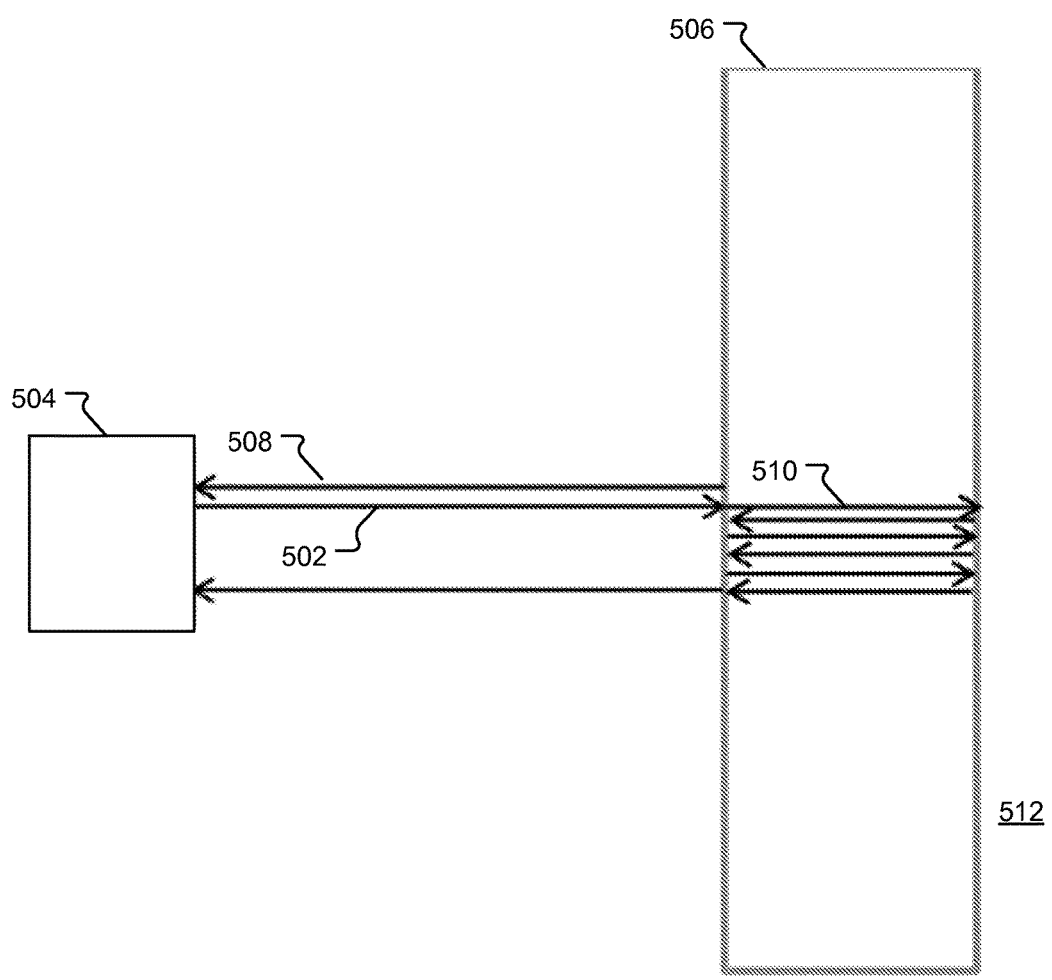
FIGS. 5-7 show first reflection and reverberations of the incident ultrasonic signal for different incidence models.

Referring to FIG. 5, an ultrasonic signal 502 sent out by a transducer 504 at normal incidence will partition at the inner wall of the casing 506 into a reflected wave 508 (traveling back to the transducer), and a transmitted wave 510 that will reverberate within the casing 506 before it heads back to the transducer 504. As the reverberations 510 reflect off of the outer wall of the casing 506, part of the energy will transmit into the cement 512. The reverberations 510 will continue until the ultrasonic energy is completely attenuated. Under this assumption of normal incidence, all reflections and transmissions occur at angles orthogonal to the two casing walls.

Figure 6:
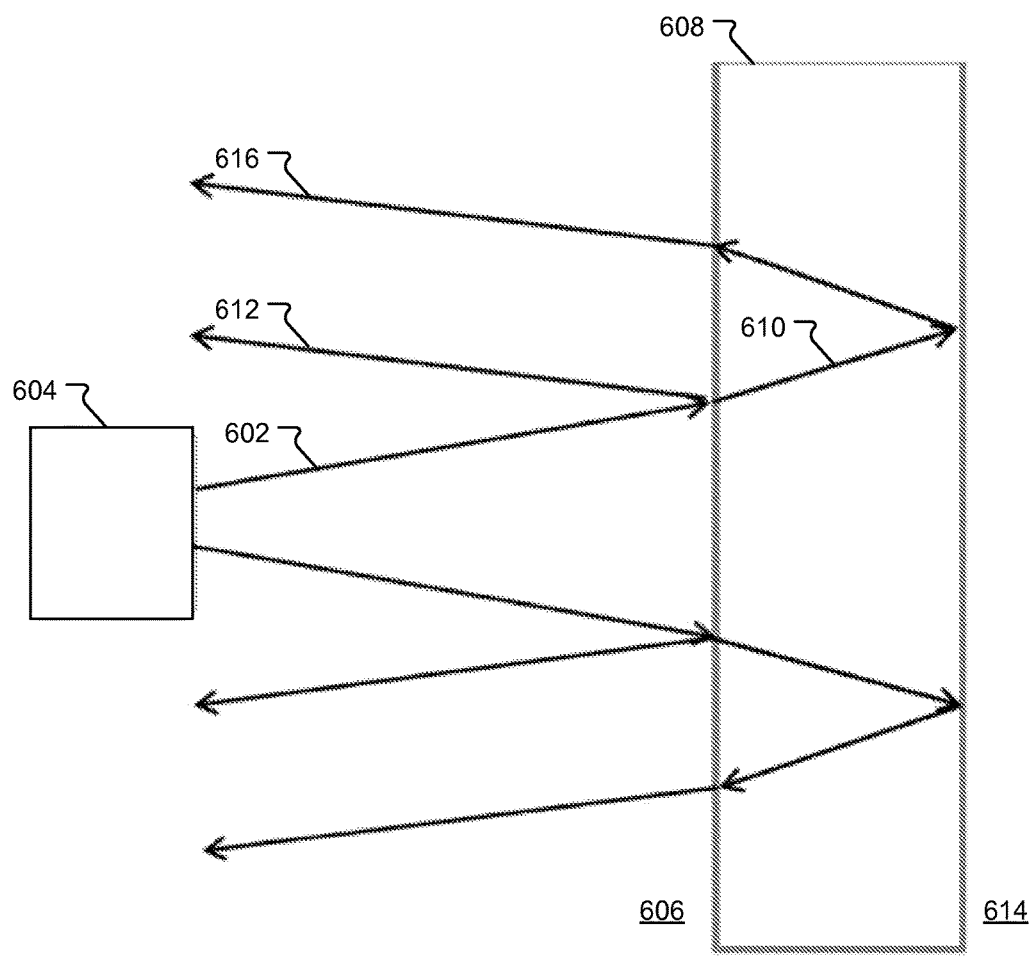

In the case of beam spreading, however, reflections and transmissions do not occur at angles orthogonal to the casing walls. Referring FIG. 6, when an incident beam 602 transmitted by a transducer 604 spreads at an interface between the borehole fluid 606 and casing 608, the wave 602 will partition into a refracted wave 610 and a reflected wave 612 with a mode conversion to shear waves into the casing 608. This partitioning will hold at the interface between the casing 608 and the cement 614 as well. The net effect of oblique incidence is the loss of some of the reverberated energy due to the wave 616 missing the transducer 604 when the wave 616 refracts back into the borehole fluid 606.

Figure 7:
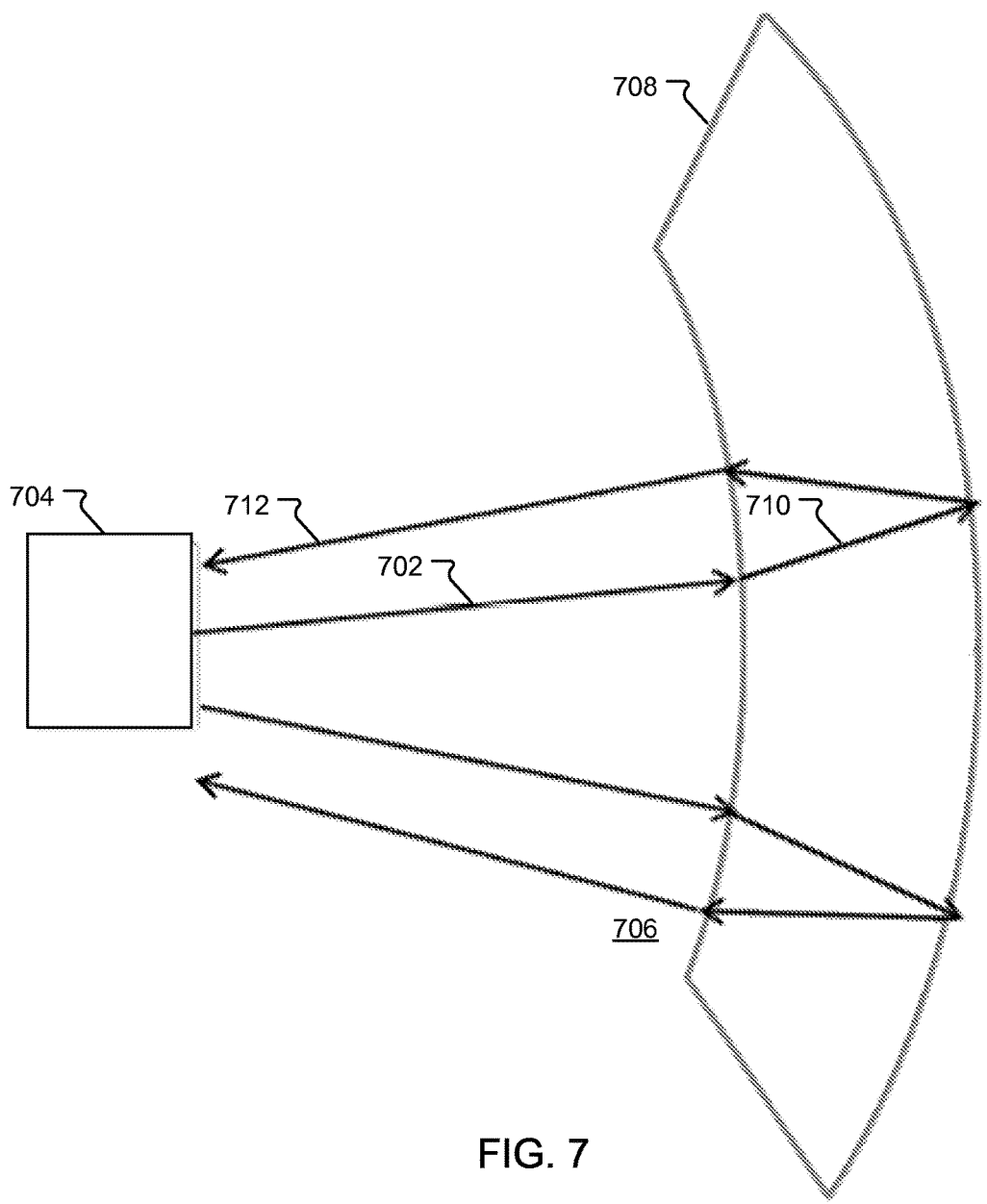

A curvature in the casing will refocus some of the waves lost in the case of beam spreading, but may not refocus all the waves. Referring to FIG. 7, when an incident beam 702 transmitted by a transducer 704 spreads at an interface between the borehole fluid 706 and casing 708, the wave 702 will be transmitted into the casing 708 as a refracted wave 710. The curvature of the casing 708 will refocus the returning wave 712 so that the wave 712 heads back to the transducer 704.

Some approaches to determining a cement bond log employ a normal-incident plane-wave theory, as shown in FIG. 5, to calculate the acoustic impedance behind the casing. In a normal-incident plane-wave theory approach, the casing is assumed to be a flat plate placed orthogonal to the transmitter of the tool. However, this approach may not completely account for the effects of beam spreading, for instance, the phenomena illustrated in FIGS. 6 and 7. Thus, the normal-incident plane-wave theory approach may be over-simplified in various situations, for instance, in situations where the casing cannot be assumed to be a flat plate, or if the beam cannot be assumed to emit energy only in orthogonal directions relative to the casing. As such, a normal-incident plane-wave theory approach may provide partial accuracy in measuring the bonding impedance behind the casing. The accuracy in measuring the bonding impedance behind a casing may be critical for the safety and economy of oil field operation.

The accuracy in measuring and calculating the bonding impedance behind the casing can be improved by using a ray tracing model, which takes into account both the radiation pattern of the transducer and the curvature of the casing. In the ray tracing model, the acoustic waves emitted from a transmitter are decomposed into many rays traveling to different directions. These rays are represented as plane waves. The magnitude of each ray is weighted according to its direction by the transducer's radiation pattern so that the beam spreading effect is taken into account.

When a ray is in a medium corresponding to the borehole fluid, it is a pure compressional wave. When a ray reaches the inner wall of the casing, it is reflected and refracted according to the interface's boundary condition. The refracted waves will have both compressional and shear waves. Both compressional and shear waves can be converted into each other at either of the two interfaces of the casing. In some implementations, a wave may be converted at the interfaces between a compressional wave and a shear wave, and vice versa. In some implementations, the ray tracing model may be simplified further by including only compressional waves in the analysis.

When the refracted waves travel inside the casing, they are reflected and refracted multiple times by both inner and outer walls of the casing. Some of the acoustic energy leaks into the cement and the rock formation around the borehole. Some acoustic waves are reflected back into the borehole fluid and recorded by the acoustic transducer. These reflected waves carry the information about the casing thickness and the acoustic impedance behind the casing. In some implementations, the reflections and refractions of each ray may be traced (both the angles and magnitudes) at the curved casing walls. The incident angle, the reflection angles, and the refraction angles of each ray are calculated according to its travel direction and the effect of the casing curvature. By adding all the waves coming into the transducer, a model waveform can be calculated. In some implementations, a model waveform is calculated using a particular tool configuration (e.g., the pulse-echo configuration 300 of FIG. 3), with an assumed cement bonding impedance and casing thickness. Model waveforms calculated using the ray tracing model may be more accurate than model waveforms created using the normal-incident plane-wave theory.

The ray tracing model can be used to evaluate casing thickness and bond impedance for thick well casings, e.g., a well casing having a thickness greater than 0.75 inches. The thickness of the casing and the impedance of the bonding can be calculated through inversion methods. The inversion methods compare the differences between the model waveforms and the measured waveforms to find the optimal fitting values for the casing thickness and the bond impedance. In some implementations, the thickness and impedance is inverted at the same time. In some implementations, the thickness and the impedance is inverted separately.

Figure 8:
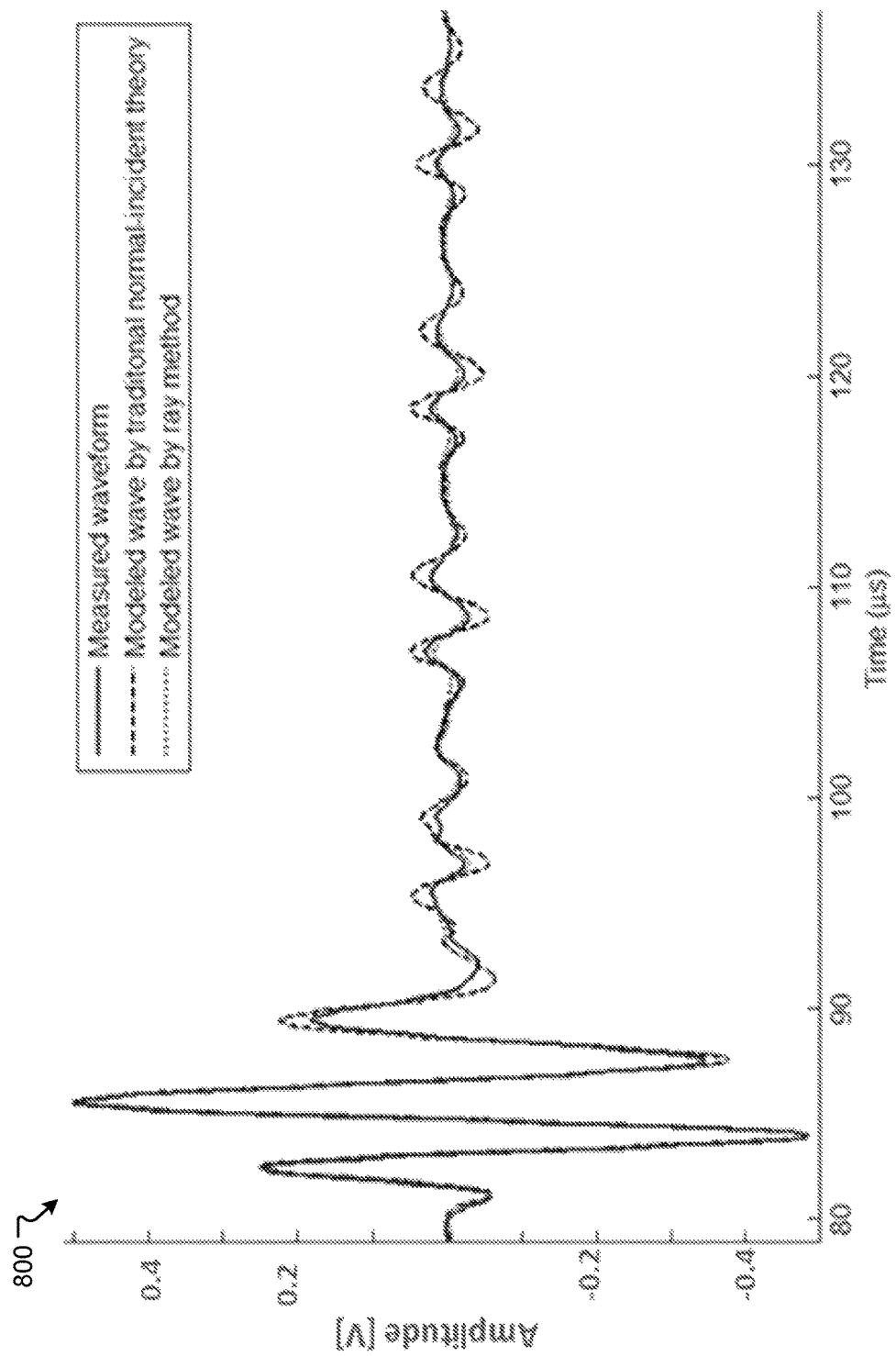
FIG. 8 shows a graph including a measured waveform, a model waveform generated by traditional normal-incident theory, and a model waveform generated by a ray tracing model.

FIG. 8 shows a graph 800 including a measured waveform, a model waveform generated by traditional normal-incident theory, and a model waveform generated by a ray tracing model. As shown in FIG. 8, a comparison of the measured waveform, the traditional normal-incidence plane-wave model waveform, and the ray tracing model waveform illustrate a great improvement in the accuracy of the ray tracing model waveform reproducing the measured waveform compared to that of the traditional waveform. The impedance can then be obtained by applying various inversion techniques, such as 1-D grid search, or generalized linear or non-linear inversion.

Figure 9:
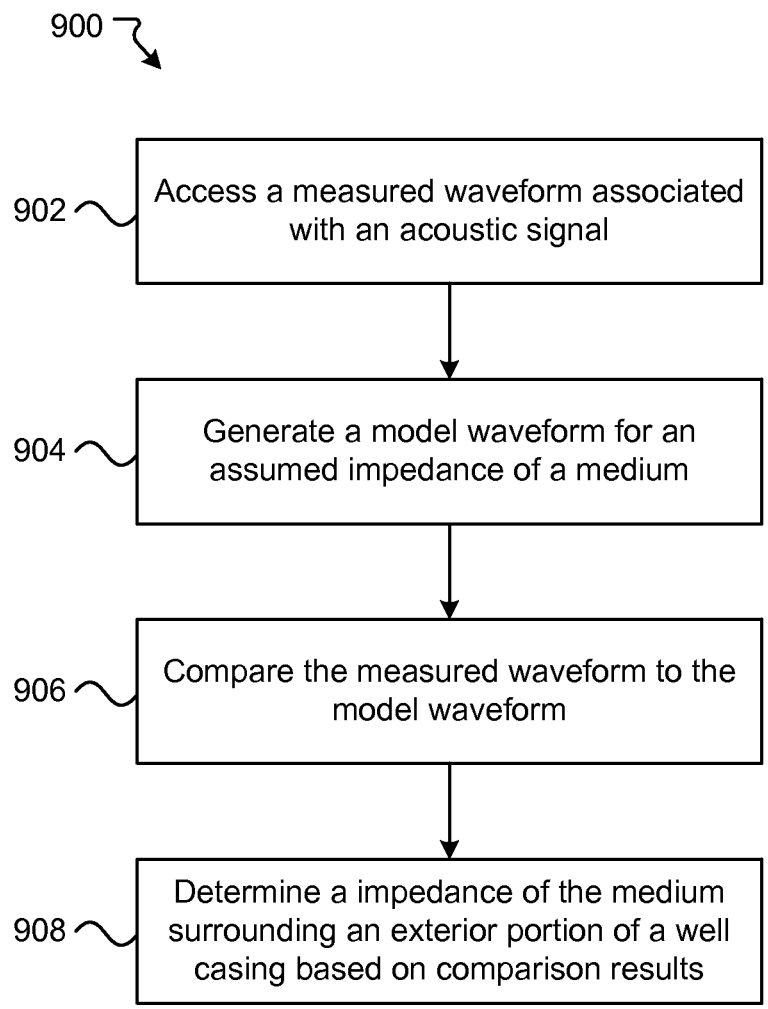
FIG. 9 is a flowchart showing an example technique for measuring the thickness of a well casing of a well structure.

FIG. 9 is a flowchart showing an example process 900 for determining bond impedance behind a well casing. Some or all of the operations in the process 900 can be implemented by one or more computing devices. For example, the process 900 can be implemented by the computing subsystem 110 in FIG. 1A, the computing system 200 in FIG. 2, or by another type of system.

Some or all of the operations in the process 900 can be implemented by one or more computing devices that are embedded with, or otherwise operated in connection with, a logging tool. For example, the process 900 can be implemented in connection with the logging tool 102 in FIG. 1A, the cement bond log tools in FIGS. 3 and 4, or another type of tool. The cement bond log tool may include an acoustic transmitter to transmit acoustic energy to a well casing. The cement bond log tool may include an acoustic receiver to detect acoustic energy returning via the well casing. The transmitter and receiver can be operated within a wellbore that includes a well casing.

In some implementations, the process 900 may include additional, fewer, or different operations performed in the order shown in FIG. 9, or in a different order. Moreover, one or more of the individual operations or subsets of the operations in the process 900 can be performed in isolation, or as part of another process. Output data generated by the process 900, including output data generated by intermediate operations, can include stored, displayed, printed, transmitted, communicated or processed information.

In some implementations, some or all of the operations in the process 900 are executed in real time during a drilling operation or another type of operation performed in a well system. An operation can be performed in real time, for example, by performing the operation in response to receiving data (e.g., from a sensor or monitoring system) without substantial delay. An operation can be performed in real time, for example, by performing the operation while monitoring for additional data. Some real time operations can receive an input and produce an output during drilling operations; in some instances, the output is made available within a time frame that allows an operator (e.g., a human or machine operator) to respond to the output, for example, by modifying the drilling operation.

In some implementations, a cement bond log tool can be placed in a wellbore defined in a subterranean region that includes multiple subsurface layers. For example, the cement bond log tool can be the logging tool 102 shown in FIG. 1A. The cement bond log tool can be transported by a drilling assembly, by a wireline logging assembly, or other hardware. The cement bond log tool can be operated at multiple tool depths in the wellbore, and each tool depth can represent a different logging point. The process 900 can be executed based on data for a single logging point or multiple logging points.

At 902, a measured waveform associated with an acoustic signal returned via a well casing is accessed based on operating an acoustic transmitter and an acoustic receiver within a wellbore that includes the well casing. The measured waveform may be accessed from a cement bond log tool or from a memory storing the measured waveform.

At 904, a model waveform for an assumed or estimated impedance of a medium, e.g., casing-cement bond, is generated. The model waveform corresponds to an assumed or estimated impedance of the medium surrounding the exterior portion of the well casing. The model waveform corresponds to a ray tracing of the acoustic signal that accounts for a radiation pattern of the acoustic transmitter and a curvature of the well casing. To generate the model waveform, an acoustic signal emitted from an acoustic transmitter is decomposed into a plurality of rays. Characteristics of each of the plurality of rays are calculated based on the radiation pattern of the acoustic transmitter and the curvature of the well casing. A subset of the plurality of rays that are returned via the well casing and detected by the acoustic receiver is determined. The characteristics of the subset of the plurality of rays are combined to generate the model waveform.

At 906, the measured waveform is compared to a model waveform. In some implementations, differences between the measured waveform and the model waveform may be compared to determine the optimal fitting values for the impedance of the medium. In some implementations, an inversion technique is applied to compare the measured waveform and the model waveform. The inversion technique may be a one-dimensional grid search, a generalized linear inversion, or a non-linear inversion. At 908, an impedance of the medium surrounding the exterior portion of the well casing is determined based on results of comparing the measured waveform to the model waveform.

The techniques described above can be implemented in digital electronic circuitry, or in computer software, firmware, or hardware, including the structures disclosed in this specification and their structural equivalents, or in combinations of one or more of them. For example, an electronic processor may be used to control acoustic transmitters and receivers (e.g. by sending electronic command signals) in order to direct an acoustic signal towards a casing and detect an acoustic signal returning from the casing. In another example, the electronic processor may be used to analyze and process data, for instance to determine an impedance of the casing based on a comparison between the detected acoustic signal and a modeled signal. In another example, the electronic process may be used to perform specific analysis techniques, for instance to calculate a ray tracing model, as described above.

The term "electronic processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple implementations separately or in any suitable subcombination.

A number of implementations of the invention have been described. Nevertheless, it will be understood that other implementations are also possible. For example, the method may include fewer steps than those illustrated or more steps that those illustrated. In addition the steps may be performed in the respective order or in different orders than illustrated.

In one general aspect, an impedance of the medium surrounding the exterior portion of the well casing is determined based on results of comparing a measured waveform associated with an acoustic signal returned via a well casing to the model waveform.

In some aspects, a measured waveform associated with an acoustic signal returned via a well casing based on operating an acoustic transmitter and an acoustic receiver within a wellbore comprising the well casing is accessed. The measured waveform is compared to a model waveform. The model waveform corresponds to an estimated impedance of a medium surrounding an exterior portion of the well casing, and the model waveform corresponds to a ray tracing of the acoustic signal that accounts for a radiation pattern of the acoustic transmitter and a curvature of the well casing. An impedance of the medium surrounding the exterior portion of the well casing is determined based on results of comparing the measured waveform to the model waveform.

Implementations of these and other aspects may include one or more of the following features. An acoustic signal emitted from the acoustic transmitter is decomposed into a plurality of rays. Characteristics of each of the plurality of rays is calculated based on the radiation pattern of the acoustic transmitter and the curvature of the well casing. A subset of the plurality of rays that are returned via the well casing and detected by the acoustic receiver is determined. The characteristics of the subset of the plurality of rays are combined to generate the model waveform.

Additionally or alternatively, implementations of these and other aspects may include one or more of the following features. Comparing the measured waveform to the model waveform includes comparing differences between the measured waveform and the model waveform. Determining the impedance of the medium includes determining optimal fitting values for the impedance of the medium based on results of comparing the differences between the measured waveform and the model waveform. Comparing the measured waveform to the model waveform includes applying an inversion technique to compare the measured waveform and the model waveform. The inversion technique includes a one-dimensional grid search. The inversion technique includes a generalized linear inversion. The inversion technique includes a non-linear inversion. Determining the impedance of the medium includes determining the impedance of the medium in real time during drilling operations or wireline logging operations.

In some aspects, a system includes an acoustic transmitter-receiver pair to be disposed within an interior portion of a well casing, and a computing system coupled with the acoustic transmitter-receiver pair. The computing system configured to access a measured waveform associated with an acoustic signal returned via a well casing based on operating an acoustic transmitter and an acoustic receiver within a wellbore comprising the well casing and compare the measured waveform to a model waveform. The model waveform corresponds to an estimated impedance of a medium surrounding an exterior portion of the well casing, and the model waveform corresponds to a ray tracing of the acoustic signal that accounts for a radiation pattern of the acoustic transmitter and a curvature of the well casing. The computing system is configured to determine an impedance of the medium surrounding the exterior portion of the well casing based on results of comparing the measured waveform to the model waveform.

Implementations of these and other aspects may include one or more of the following features. The computing system is configured to decompose an acoustic signal emitted from the acoustic transmitter into a plurality of rays, calculate characteristics of each of the plurality of rays based on the radiation pattern of the acoustic transmitter and the curvature of the well casing, determine a subset of the plurality of rays that are returned via the well casing and detected by the acoustic receiver, and combine the characteristics of the subset of the plurality of rays to generate the model waveform. The computing system is configured to compare the measured waveform to the model waveform includes the computing system is configured to compare differences between the measured waveform and the model waveform. The computing system is configured to determine the impedance of the medium includes the computing system is configured to determine optimal fitting values for the impedance of the medium based on results of comparing the differences between the measured waveform and the model waveform.

Additionally or alternatively, implementations of these and other aspects may include one or more of the following features. The computing system is configured to compare the measured waveform to the model waveform includes the computing system is configured to apply an inversion technique to compare the measured waveform and the model waveform. The inversion technique comprises a one-dimensional grid search. The inversion technique comprises a generalized linear inversion. The inversion technique comprises a non-linear inversion. The computing system is configured to determine the impedance of the medium includes the computing system is configured to determine the impedance of the medium in real time during drilling operations or wireline logging operations.

Other implementations are within the scope of the following claims.

What is claimed is:

1. A method comprising:
    emitting, by an acoustic transmitter of a logging tool disposed within a wellbore, acoustic energy towards a well casing of the wellbore;
    detecting, by an acoustic receiver of the logging tool, an acoustic signal returning via the well casing;
    determining, based on the acoustic signal, a measured waveform associated with the acoustic signal;
    comparing the measured waveform to a model waveform, wherein the model waveform corresponds to an estimated impedance of a medium surrounding an exterior portion of the well casing, and the model waveform corresponds to a ray tracing of the acoustic signal that accounts for a radiation pattern of the acoustic transmitter and a curvature of the well casing;
    determining, by operation of data processing apparatus, an impedance of the medium surrounding the exterior portion of the well casing based on results of comparing the measured waveform to the model waveform; and determining, by operation of the data processing apparatus, a thickness of the well casing based on a correlation between the measured waveform and the model waveform.

2. The method of claim 1, further comprising:
decomposing the acoustic energy emitted from the acoustic transmitter into a plurality of rays;
calculating characteristics of each of the plurality of rays based on the radiation pattern of the acoustic transmitter and the curvature of the well casing;
determining a subset of the plurality of rays that are returned via the well casing and detected by the acoustic receiver; and
combining the characteristics of the subset of the plurality of rays to generate the model waveform.

3. The method of claim 1, wherein:
comparing the measured waveform to the model waveform comprises comparing differences between the measured waveform and the model waveform; and
determining the impedance of the medium comprises determining optimal fitting values for the impedance of the medium based on results of comparing the differences between the measured waveform and the model waveform.

4. The method of claim 1, wherein comparing the measured waveform to the model waveform comprises applying an inversion technique to compare the measured waveform and the model waveform.

5. The method of claim 4, wherein the inversion technique comprises a one-dimensional grid search.

6. The method of claim 4, wherein the inversion technique comprises a generalized linear inversion.

7. The method of claim 4, wherein the inversion technique comprises a non-linear inversion.

8. The method of claim 1, wherein determining the impedance of the medium comprises determining the impedance of the medium in real time during drilling operations or wireline logging operations.

9. A non-transitory computer-readable medium encoded with instructions that, when executed by data processing apparatus, cause the data processing apparatus to perform operations comprising:
emitting, by an acoustic transmitter of a logging tool disposed within a wellbore, acoustic energy towards a well casing of the wellbore;
detecting, by an acoustic receiver of the logging tool, an acoustic signal returning via the well casing;
determining, based on the acoustic signal, a measured waveform associated with the acoustic signal;
comparing the measured waveform to a model waveform, wherein the model waveform corresponds to an estimated impedance of a medium surrounding an exterior portion of the well casing, and the model waveform corresponds to a ray tracing of the acoustic signal that accounts for a radiation pattern of the acoustic transmitter and a curvature of the well casing;
determining an impedance of the medium surrounding the exterior portion of the well casing based on results of comparing the measured waveform to the model waveform; and
determining a thickness of the well casing based on a correlation between the measured waveform and the model waveform.

10. The non-transitory computer-readable medium of claim 9, wherein the operations further comprise:
decomposing the acoustic energy emitted from the acoustic transmitter into a plurality of rays;
calculating characteristics of each of the plurality of rays based on the radiation pattern of the acoustic transmitter and the curvature of the well casing;
determining a subset of the plurality of rays that are returned via the well casing and detected by the acoustic receiver; and
combining the characteristics of the subset of the plurality of rays to generate the model waveform.

11. The non-transitory computer-readable medium of claim 9, wherein:
comparing the measured waveform to the model waveform comprises comparing differences between the measured waveform and the model waveform; and
determining the impedance of the medium comprises determining optimal fitting values for the impedance of the medium based on results of comparing the differences between the measured waveform and the model waveform.

12. The non-transitory computer-readable medium of claim 9, wherein comparing the measured waveform to the model waveform comprises applying an inversion technique to compare the measured waveform and the model waveform.

13. The non-transitory computer-readable medium of claim 12, wherein the inversion technique comprises a one-dimensional grid search.

14. The non-transitory computer-readable medium of claim 12, wherein the inversion technique comprises a generalized linear inversion.

15. The non-transitory computer-readable medium of claim 12, wherein the inversion technique comprises a non-linear inversion.

16. The non-transitory computer-readable medium of claim 9, wherein determining the impedance of the medium comprises determining the impedance of the medium in real time during drilling operations or wireline logging operations.

17. A system comprising:
a logging tool having an acoustic transmitter and an acoustic receiver pair to be disposed within a wellbore comprising a well casing, wherein the logging tool is configured to:
emit, by the acoustic transmitter acoustic energy towards the well casing of the wellbore; and
detect, by the acoustic receiver, an acoustic signal returning via the well casing; and
a computing system coupled with the acoustic transmitter-receiver pair, the computing system is configured to:
determine, based on the acoustic signal, a measured waveform associated with the acoustic signal;
compare the measured waveform to a model waveform, wherein the model waveform corresponds to an estimated impedance of a medium surrounding an exterior portion of the well casing, and the model waveform corresponds to a ray tracing of the acoustic signal that accounts for a radiation pattern of the acoustic transmitter and a curvature of the well casing;
determine an impedance of the medium surrounding the exterior portion of the well casing based on results of comparing the measured waveform to the model waveform; and determine a thickness of the well casing based on the a correlation between the measured waveform and the model waveform.

18. The system of claim 17, wherein the computing system is configured to:
decompose the acoustic energy emitted from the acoustic transmitter into a plurality of rays;
calculate characteristics of each of the plurality of rays based on the radiation pattern of the acoustic transmitter and the curvature of the well casing;
determine a subset of the plurality of rays that are returned via the well casing and detected by the acoustic receiver; and
combine the characteristics of the subset of the plurality of rays to generate the model waveform.

19. The system of claim 17, wherein:
the computing system is configured to compare the measured waveform to the model waveform comprises the computing system is configured to compare differences between the measured waveform and the model waveform; and
the computing system is configured to determine the impedance of the medium comprises the computing system is configured to determine optimal fitting values for the impedance of the medium based on results of comparing the differences between the measured waveform and the model waveform.

20. The system of claim 17, wherein the computing system is configured to compare the measured waveform to the model waveform comprises the computing system is configured to apply an inversion technique to compare the measured waveform and the model waveform.

* * * * *

UNITED STATES PATENT AND TRADEMARK OFFICE
CERTIFICATE OF CORRECTION

PATENT NO. : 10,301,932 B2
APPLICATION NO. : 14/417439
DATED : May 28, 2019
INVENTOR(S) : Tianrun Chen et al.

Page 1 of 1

It is certified that error appears in the above-identified patent and that said Letters Patent is hereby corrected as shown below:

On the Title Page

Item (57), Replace the Abstract with the following:

ABSTRACT
Systems, methods, and software for determining a thickness of a well casing are described. In some aspects, the thickness of the well casing is determined based on results of comparing a measured waveform and model waveforms. The measured waveform and model waveforms are generated based on operating an acoustic transmitter and an acoustic receiver within a wellbore comprising the well casing.

Signed and Sealed this
Twenty-ninth Day of October, 2019

Andrei Iancu
*Director of the United States Patent and Trademark Office*